United States Patent
Emanuel et al.

(10) Patent No.: US 10,509,852 B2
(45) Date of Patent: *Dec. 17, 2019

(54) UTILIZING CLASSIFICATION AND TEXT ANALYTICS FOR ANNOTATING DOCUMENTS TO ALLOW QUICK SCANNING

(71) Applicant: INTERNATIONAL BUSINESS MACHINES CORPORATION, Armonk, NY (US)

(72) Inventors: Barton W. Emanuel, Manassas, VA (US); Mark W. Paulis, New York, NY (US); Mark L. Roboff, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 97 days.

This patent is subject to a terminal disclaimer.

(21) Appl. No.: 14/227,960

(22) Filed: Mar. 27, 2014

(65) Prior Publication Data

US 2014/0215304 A1 Jul. 31, 2014

Related U.S. Application Data

(63) Continuation of application No. 13/710,025, filed on Dec. 10, 2012.

(51) Int. Cl.
*G06F 17/20* (2006.01)
*G06F 17/24* (2006.01)
*G06F 17/27* (2006.01)

(52) U.S. Cl.
CPC .......... *G06F 17/241* (2013.01); *G06F 17/271* (2013.01); *G06F 17/274* (2013.01); *G06F 17/2755* (2013.01); *G06F 17/2785* (2013.01)

(58) Field of Classification Search
CPC .. G06F 17/271; G06F 17/274; G06F 17/2785; G06F 17/241; G06F 17/2755; G06F 17/30654; G06F 17/30684; G06F 17/30722; G06F 17/30716; G06F 17/21
USPC ................ 704/10, 1, 7, 9; 707/708; 715/854
See application file for complete search history.

(56) References Cited

U.S. PATENT DOCUMENTS

| | | | |
|---|---|---|---|
| 6,909,805 B2 | 6/2005 | Ma et al. | |
| 7,162,465 B2 | 1/2007 | Jenssen et al. | |
| 7,284,191 B2 * | 10/2007 | Grefenstette | G06F 16/30 715/230 |
| 7,558,778 B2 | 7/2009 | Carus et al. | |
| 7,558,792 B2 | 7/2009 | Bier | |

(Continued)

FOREIGN PATENT DOCUMENTS

EP  1304625  7/2005

OTHER PUBLICATIONS https://www.academia.edu/24153790/A_vision_of_an_information_landscape_for_EU_citizens_Title_A_vision_of_an_information_landscape_for_EU_citizens, attached as Arskog 2007.*

(Continued)

*Primary Examiner* — Mohammed H Zuberi
(74) *Attorney, Agent, or Firm* — Gates & Cooper LLP (57) ABSTRACT

Classification, text analytics, and natural language processing are used to evaluate passages, extract text, identify concepts, and provide visual cues and notations to assist readers in scanning and evaluating large amounts of information in a document.

8 Claims, 5 Drawing Sheets

(56) References Cited

U.S. PATENT DOCUMENTS

| | | | |
|---|---|---|---|
| 7,570,262 B2 | 8/2009 | Landau et al. | |
| 7,607,081 B1* | 10/2009 | Jones | G06F 17/211 715/205 |
| 7,783,614 B2* | 8/2010 | Jones | G06F 17/2229 707/694 |
| 7,907,140 B2 | 3/2011 | Landau et al. | |
| 7,945,600 B1* | 5/2011 | Thomas | G06F 16/353 707/804 |
| 8,412,516 B2 | 4/2013 | Verma et al. | |
| 8,869,027 B2* | 10/2014 | Louch | G06F 3/0481 715/700 |
| 2002/0010707 A1* | 1/2002 | Chang | G06F 17/211 715/205 |
| 2003/0051214 A1* | 3/2003 | Graham | G06F 17/30017 715/230 |
| 2003/0070139 A1* | 4/2003 | Marshall | G06F 17/241 715/231 |
| 2004/0034832 A1 | 2/2004 | Taylor et al. | |
| 2004/0068690 A1 | 4/2004 | Wood | |
| 2004/0078190 A1* | 4/2004 | Fass | G06F 17/241 704/7 |
| 2005/0060643 A1* | 3/2005 | Glass | G06F 17/241 715/205 |
| 2005/0108001 A1* | 5/2005 | Aarskog | G06F 17/271 704/10 |
| 2006/0010368 A1* | 1/2006 | Kashi | G06F 17/2247 715/205 |
| 2006/0156220 A1* | 7/2006 | Dreystadt | G06F 17/211 715/202 |
| 2006/0156222 A1 | 7/2006 | Chi et al. | |
| 2007/0016863 A1* | 1/2007 | Qu | G06F 17/30731 715/702 |
| 2007/0294614 A1 | 12/2007 | Jacquin et al. | |
| 2008/0027933 A1* | 1/2008 | Hussam | G06F 16/904 |
| 2008/0126080 A1 | 5/2008 | Saldanha et al. | |
| 2009/0024590 A1 | 1/2009 | Sturge | |
| 2009/0138793 A1 | 5/2009 | Verma et al. | |
| 2009/0216562 A1 | 8/2009 | Faulkner et al. | |
| 2009/0216715 A1 | 8/2009 | Dexter | |
| 2009/0271179 A1* | 10/2009 | Marchisio | G06F 16/3338 704/9 |
| 2009/0271696 A1 | 10/2009 | Bailor et al. | |
| 2009/0276771 A1 | 11/2009 | Nickolov et al. | |
| 2010/0241639 A1* | 9/2010 | Kifer | G06F 17/30719 707/754 |
| 2010/0278453 A1 | 11/2010 | King | |
| 2011/0166824 A1 | 7/2011 | Haisty et al. | |
| 2012/0191740 A1 | 7/2012 | Moehrle | |
| 2013/0013999 A1 | 1/2013 | Kerry-Tyerman et al. | |
| 2013/0151238 A1* | 6/2013 | Beaurpere | G06F 17/28 704/9 |
| 2013/0155118 A1* | 6/2013 | Robinson | G06F 17/30716 345/672 |
| 2014/0019438 A1 | 1/2014 | Le Chevalier et al. | |
| 2014/0019843 A1 | 1/2014 | Schmidt | |
| 2015/0019207 A1 | 1/2015 | Dou et al. | |
| 2016/0078102 A1* | 3/2016 | Crouch | G06F 16/313 707/722 |
| 2016/0162456 A1* | 6/2016 | Munro | G06F 16/35 704/9 |
| 2016/0344828 A1* | 11/2016 | Hausler | H04L 67/42 |
| 2018/0366013 A1* | 12/2018 | Arvindam | G09B 5/06 |

OTHER PUBLICATIONS

Burnard, L., "TEI Lite: Encoding for Interchange: an introduction to the TEI", Final revised edition for Text Encoding Initiative (TEI) P5, C. M. Sperbery-McQuee, Aug. 2012, published by www.tei-c.org.

* cited by examiner

UTILIZING CLASSIFICATION AND TEXT ANALYTICS FOR ANNOTATING DOCUMENTS TO ALLOW QUICK SCANNING

CROSS-REFERENCE TO RELATED APPLICATION

This application is a continuation of the following co-pending and commonly-assigned patent application:

U.S. Utility patent application Ser. No. 13/710,025, filed on Dec. 10, 2012, by Barton Wayne Emanuel, Mark William Paulis and Mark Leonard Roboff, entitled "UTILIZING CLASSIFICATION AND TEXT ANALYTICS FOR ANNOTATING DOCUMENTS TO ALLOW QUICK SCANNING," attorneys docket number SVL920120098US1 (G&C 30571.350-US-01);

which application is incorporated by reference herein.

BACKGROUND

1. Field of the Invention.

The present invention relates generally to annotating documents, and in particular, to a method, apparatus, and article of manufacture for utilizing classification and text analytics to annotate lengthy documents to allow quick scanning 2. Description of the Related Art.

When faced with quickly scanning large documents or publications, humans may miss many important facts and fail to understand key points and issues. Understanding and retention of concepts can be improved by manual techniques such as highlighting key phrases and concepts, or making marginal notations. Such manual techniques take time for humans to perform. Productivity may be increased and manual effort reduced by automatically notating texts to highlight key concepts and to list salient facts.

BRIEF SUMMARY

A computer-implemented method provides the ability to annotate a document. A document is obtained. The type and subject domain of the document are determined and an annotation strategy and domain model to load are determined based on the document type and subject domain respectively. The document is segmented into paragraphs and sections based on a document structure. A text analytics system provides annotations for each paragraph of the document based on the domain model and annotation strategy. Text in the document is annotated by applying the annotations to the original text of the document. The document (including the annotations) is then rendered A system is utilized to annotate a document. The system includes a classifier, an annotation model, a text analytics system, and a custom viewer/renderer application. The classifier has domain and document-type taxonomies. The classifier determines a type of the document and a subject domain of the document. The annotation model has information that it uses to determine and drive an annotation strategy based on various document types. The text analytics system has multiple domain models, and loads the appropriate domain model based on the subject domain The text analytics system is also configured to provide annotations of each paragraph of the document based on the domain model and annotation model. The custom viewer/renderer application annotates the document with the annotations and renders the document including the annotations.

A computer program product annotates a document. The computer program product comprises a computer readable storage medium having computer readable program code embodied therewith. Computer readable program code is configured to obtain the document. Computer readable program code is configured to determine a type of the document. Computer readable program code is configured to determine a subject domain of the document. Computer readable program code is configured to determine an annotation strategy based on the type of document. Computer readable program code is configured to determine a domain model to load based on the subject domain. Computer readable program code is configured to segment the document into paragraphs and sections based on a document structure. Computer readable program code is configured to provide annotations for each paragraph of the document based on the domain model and annotation strategy. Computer readable program code is configured to annotate text in the document by applying the annotations to original text of the document. Computer readable program code is configured to render the document including the annotations.

BRIEF DESCRIPTION OF THE SEVERAL VIEWS OF THE DRAWINGS

Referring now to the drawings in which like reference numbers represent corresponding parts throughout.

DETAILED DESCRIPTION

In the following description, reference is made to the accompanying drawings which form a part hereof, and which is shown, by way of illustration, several embodiments of the present invention. It is understood that other embodiments may be utilized and structural changes may be made without departing from the scope of the present invention.
Overview Embodiments of the invention use classification, text analytics, and natural language processing to evaluate passages, extract text, identify concepts, and provide visual cues and notations to assist readers in scanning and evaluating large amounts of information. Documents are processed on a paragraph level and present relevant facts as anchor points or margin notations, in printed form or in a custom document viewer, so that a reader can scan through a document, quickly assimilate the important facts, with the ability to quickly go to the original text for deeper understanding.
Hardware Environment As will be appreciated by one skilled in the art, aspects of the present invention may be embodied as a system, method or computer program product.

Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
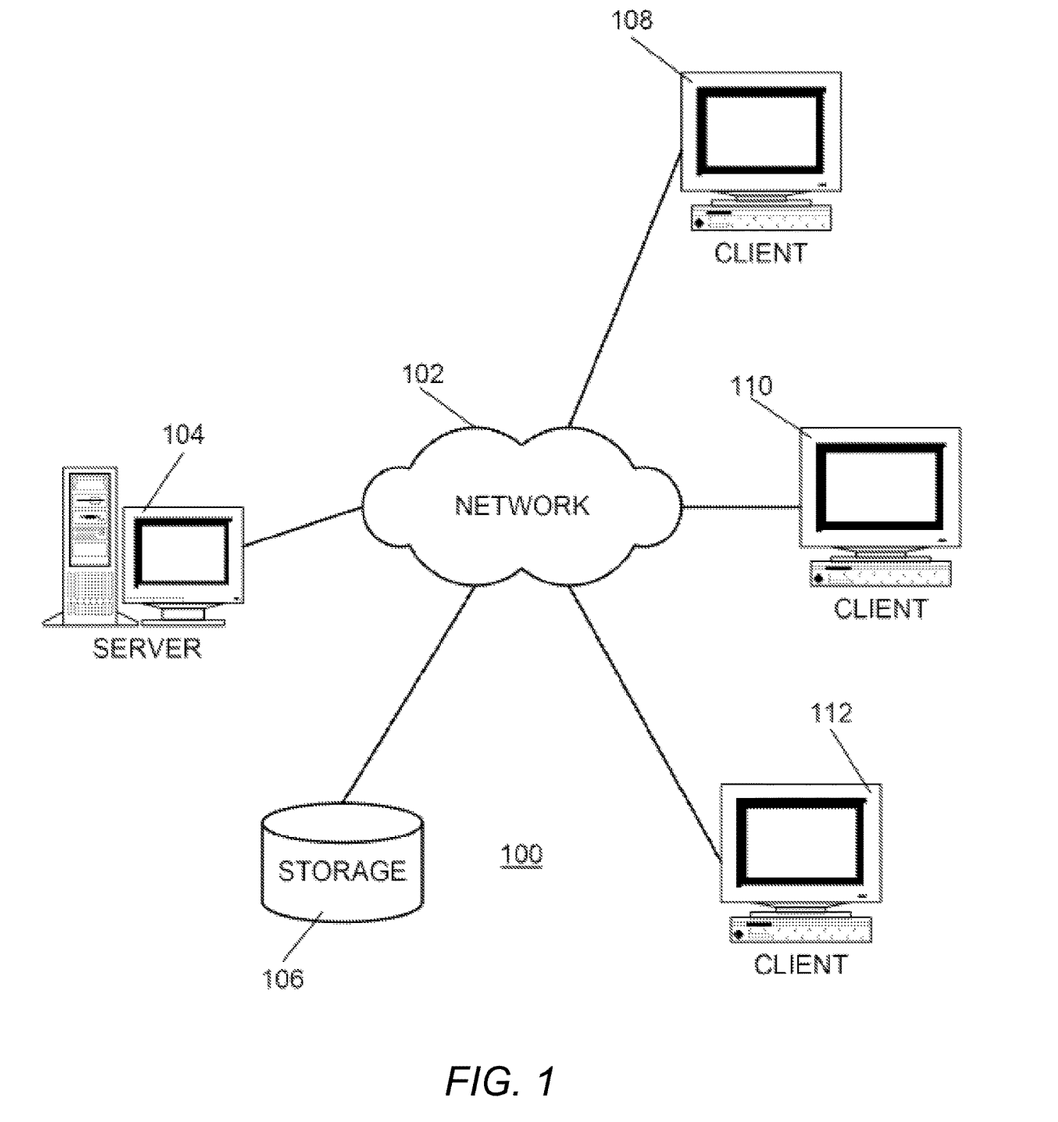
FIG. 1 illustrates a pictorial representation of a network data processing system used in accordance with one or more embodiments of the invention.

With reference now to FIG. 1, a pictorial representation of a network data processing system 100 is presented in which the present invention may be implemented. Network data processing system 100 contains a network 102, which is the medium used to provide communications links between various devices and computers connected together within network data processing system 100. Network 102 may include connections, such as wire, wireless communication links, or fiber optic cables etc.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and programs to clients 108, 110 and 112. Clients 108, 110 and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another.

Figure 2:
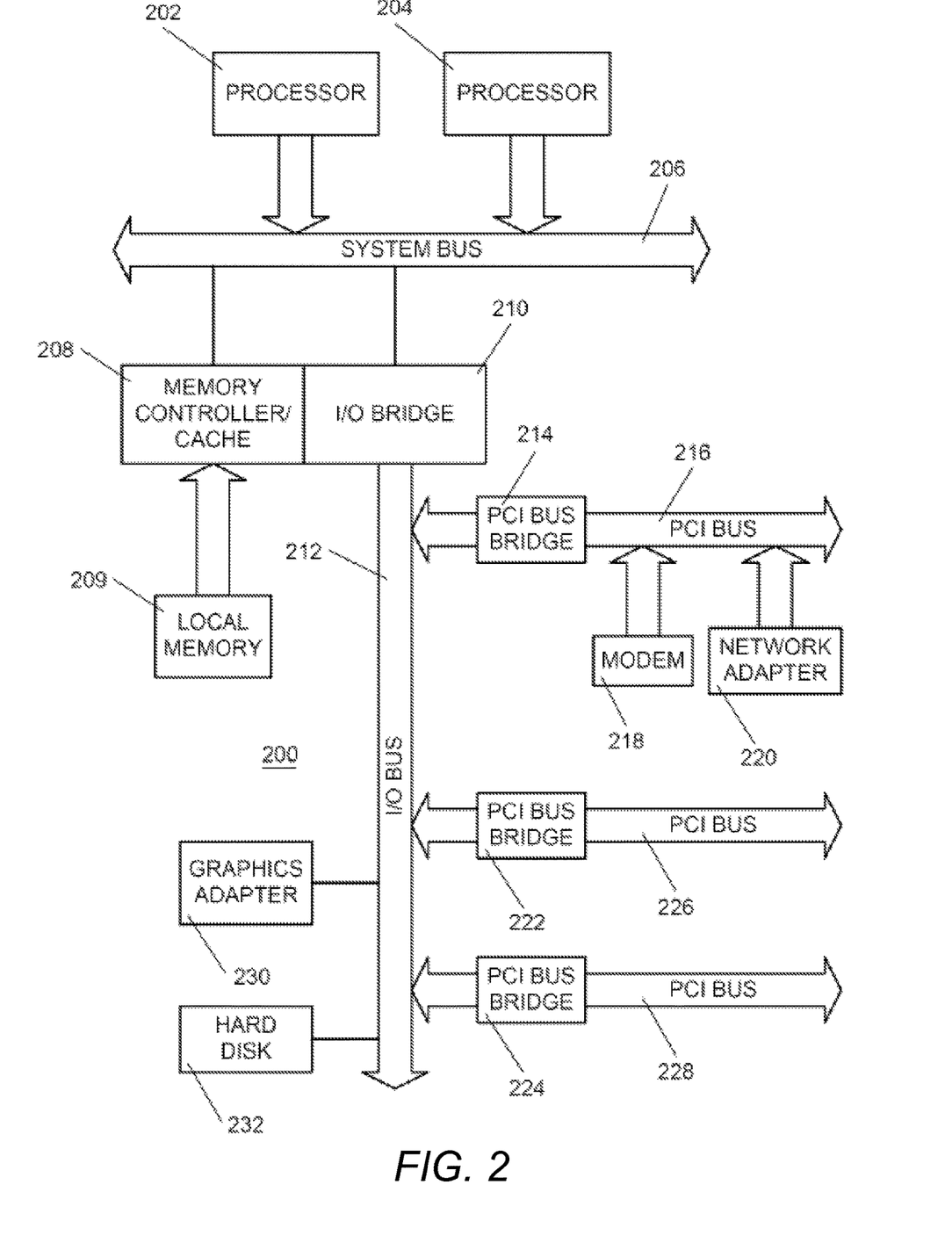
FIG. 2 illustrates a block diagram of a data processing system that may be implemented as a server in accordance with an embodiment of the present invention.

Referring to FIG. 2, a block diagram of a data processing system that may be implemented as a server, such as server 104 in FIG. 1, is depicted in accordance with an embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to network computers 108, 110 and 112 in FIG. 1 may be provided through modem 218 and network adapter 220 connected to PCI local bus 216 through add-in boards. Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Server 104 may provide a suitable website or other internet-based graphical user interface accessible by users to enable user interaction for aspects of an embodiment of the present invention. In one embodiment, Netscape web server, IBM Websphere Internet tools suite, an IBM DB2 for Linux, Unix and Windows (also referred to as "IBM DB2 for LUW") platform and a Sybase database platform are used in conjunction with a Sun Solaris operating system platform. Additionally, components such as JBDC drivers, IBM connection pooling and IBM MQ series connection methods may be used to provide data access to several sources. The term webpage as it is used herein is not meant to limit the type of documents and programs that might be used to interact with the user. For example, a typical website might include, in addition to standard HTML documents, various forms, Java applets, JavaScript, active server pages (ASP), Java Server Pages (JSP), common gateway interface scripts (CGI), extensible markup language (XML), dynamic HTML, cascading style sheets (CSS), helper programs, plug-ins, and the like.

Figure 3:
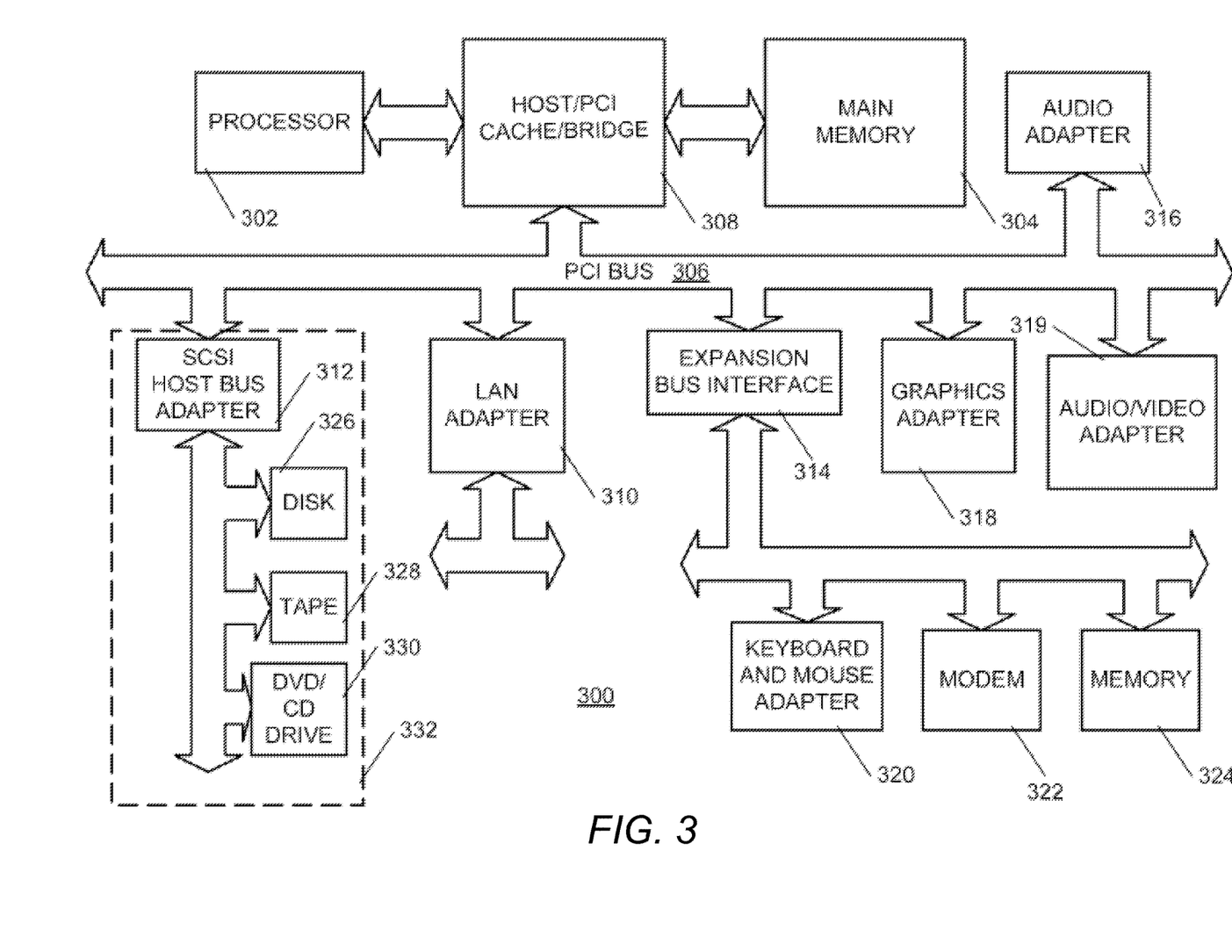
FIG. 3 illustrates a block diagram of a data processing system in accordance with an embodiment of the present invention.

With reference now to FIG. 3, a block diagram illustrating a data processing system is depicted in which aspects of an embodiment of the invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, Small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots.

Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP®, which is available from Microsoft Corporation. An object oriented programming system such as Java may run in conjunction with the operating system and provide calls to the operating system from Java programs or programs executing on data processing system 300. "Java" is a trademark of Sun Microsystems, Inc. Instructions for the operating system, the object-oriented operating system, and programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 may also be a notebook computer or hand held computer as well as a PDA. Further, data processing system 300 may also be a kiosk or a Web appliance. Further, the present invention may reside on any data storage medium (i.e., floppy disk, compact disk, hard disk, tape, ROM, RAM, etc.) used by a computer system. (The terms "computer," "system," "computer system," and "data processing system" and are used interchangeably herein.)

Software Embodiments

Figure 4:
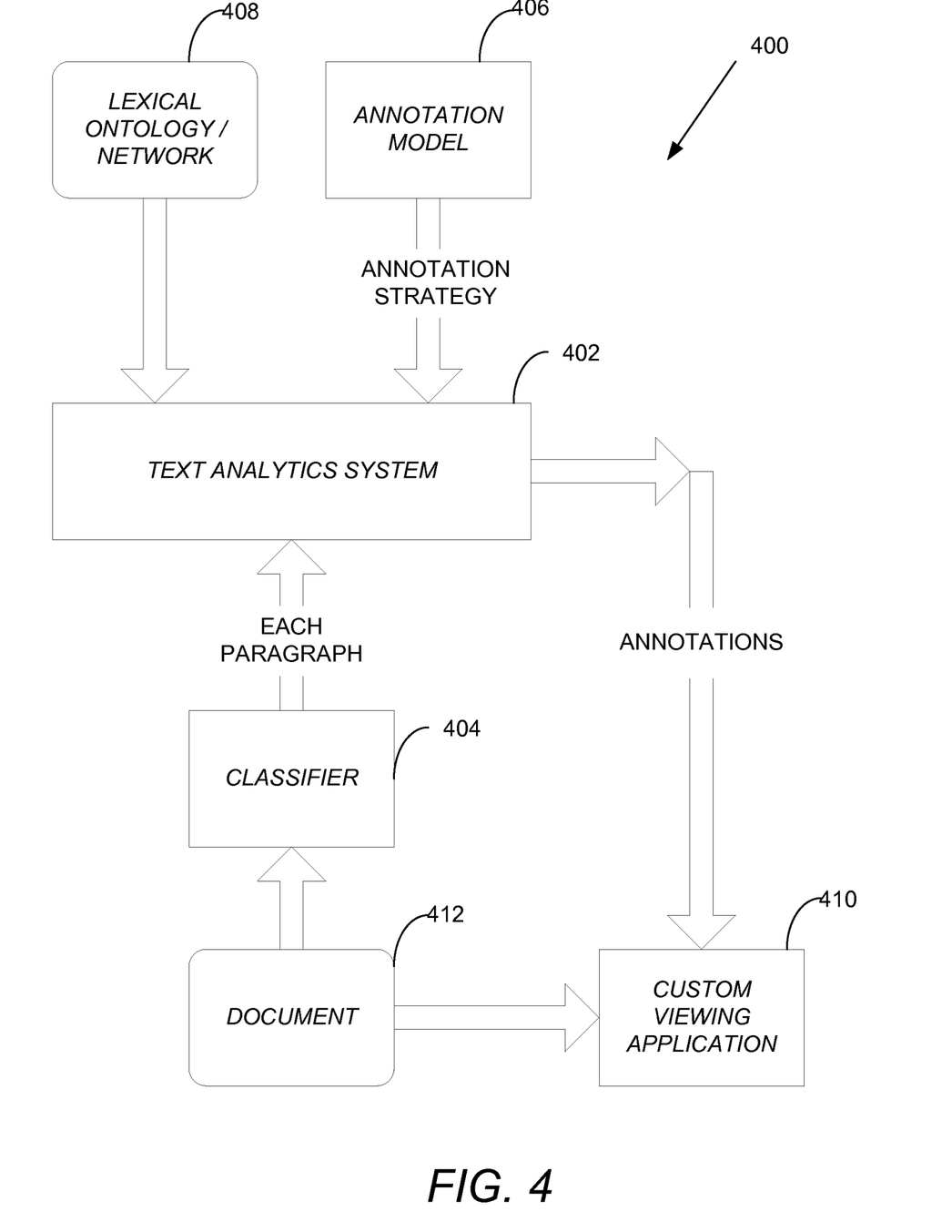
FIG. 4 illustrates a system used to annotate a document in accordance with one or more embodiments of the invention.

FIG. 4 illustrates a system 400 used to annotate a document in accordance with one or more embodiments of the invention. System 400 may be implemented by one or more servers 104, clients 108, 110, and 112, and/or any other components described above and set forth in FIGS. 1-3.

System 100 consists of a text analytics system 402 with multiple domain models, a classifier 404 with domain and document-type taxonomies, an annotation model 406 with information to determine and drive the annotation strategy for various document types, a general lexical ontology or network 408, and a custom application (viewer or renderer) 410 which could be server based or on individual workstations.

Figure 5:
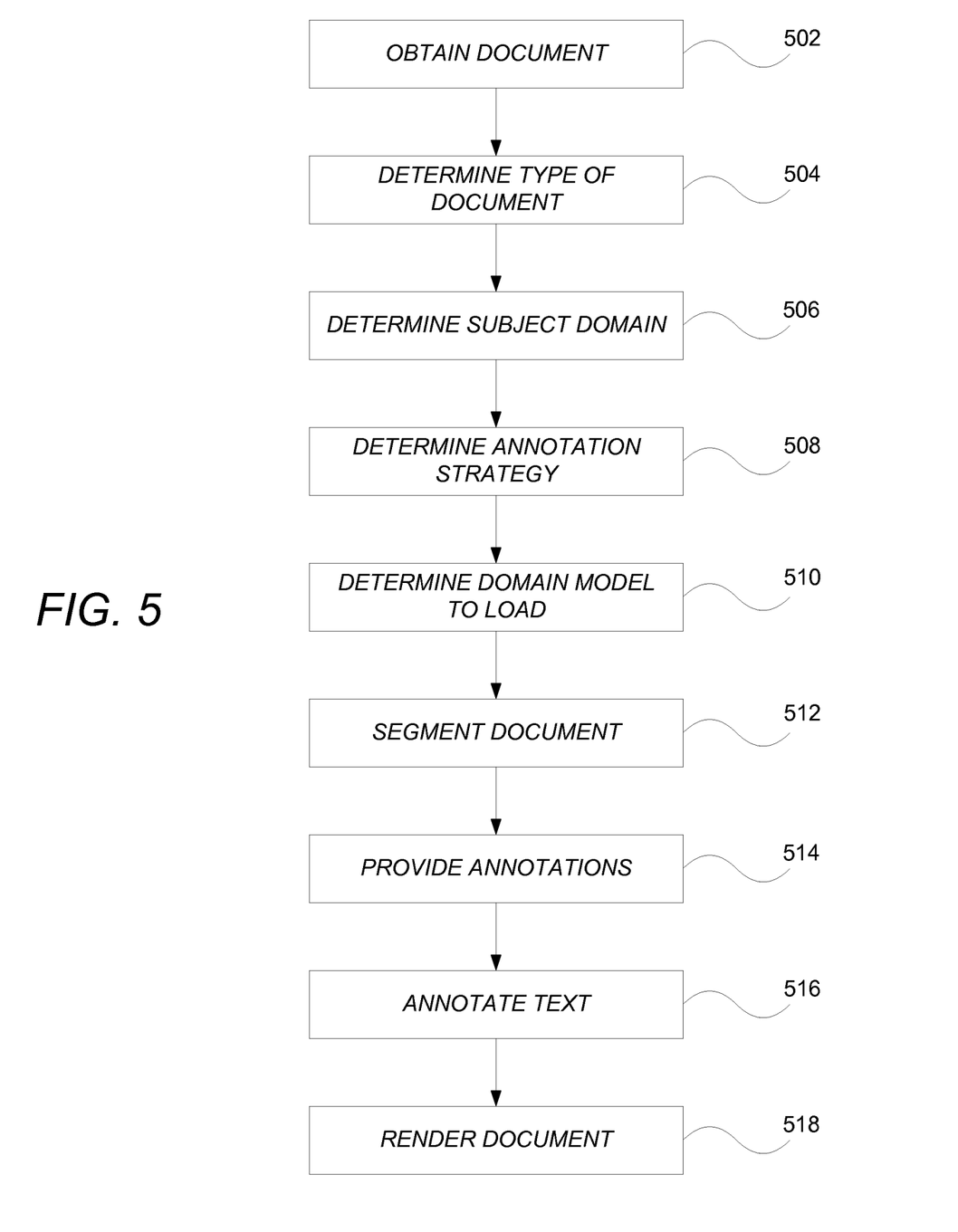
FIG. 5 illustrates the logical flow for annotating a document in accordance with one or more embodiment of the invention.

FIG. 5 illustrates the logical flow for annotating a document in accordance with one or more embodiment of the invention. The following description refers to the steps of FIG. 5 and the components of FIG. 4. For any given document 412, the steps of FIG. 5 may be performed. As set forth herein, the steps of FIG. 5 are performed by system 400 of FIG. 4 without user input. In other words, the evaluation and annotation of the document may be performed automatically, and dynamically, without user interference. Accordingly, human interaction with the system 400 is not needed as the system 400 automatically evaluates the text and annotates the documents without further user input and without relying on a base model established manually by other users.

At step 502, a document is obtained.

The classifier 404 is run on the document 412 in steps 504 and 506 to determine the type of document (step 504) (e.g., patent application, legislative bill, scholarly article, etc), and the subject domain (step 506) (e.g., computer hardware, finance, particle physics). In this regard, the type of document consists of a category or format within which the document is written. The subject domain is the field, topic, or genre of the content set forth in the document.

The type of document will determine the annotation strategy, and the subject domain will determine which domain model to load into the Text Analytics system 402. Consequently, at step 506, the annotation model 506 determines and drives the annotation strategy (based on the type of document). The annotation strategy specifies what types of annotations to utilize, the location of the annotations, etc. More specifically, the annotation strategy determines which text analytics model, or which text analytics annotators (or pipeline of annotators), or which text analytics engine to use. Similarly, at step 508, the domain model to load is determined (based on the subject domain). Steps 506 and 508 further load the appropriate model (i.e., domain model) into the text analytics system 402. The domain model may be embodied in dictionaries of domain vocabulary, or rules, or both. The model identifies terms, phrases, entities, and concepts, and possibly also relationships, which are important to the domain.

At step 512, the classifier 404 segments the document 412 into paragraphs and sections, according to the document structure. Each paragraph is sent to the text analytics system 402 for notation.

At step 514, the text analytics system 402 returns/provides annotations. Such annotations include parts of speech (nouns, verbs, etc), phrases, proper names, dates, domain specific keywords and concepts, relationships, and other entities and annotations as determined by the domain model and annotation strategy.

The results/annotations may optionally be normalized by identifying synsets (i.e., sets of one or more synonyms) and determining normal forms using the lexical ontology 408 (i.e., within step 514). Normal forms are also known as base forms and/or canonical forms. Terms and concepts are normalized to this form so that normal forms can be compared to each other. For example, McIntosh and Granny Smith are both apples . . . apple might be the normal form. As another example, automobile, cars and car may be normalized to car. Step 514 may further include adjusting the results/annotations by removing stop words, words frequently occurring throughout the document 412, the domain, or a set of documents (corpus) of which the current document is a member.

At step 516, the text is annotated (e.g., by a custom viewing application 410) by applying the results to the original text, by highlighting, and by providing margin notations or other indicators. At step 518, the annotated text is rendered for display or for print (e.g., via custom viewing application 410). Some possible notations might be in the form of word/phrase/concept clouds, lists, quality indicators, timelines, or other types of indicators as appropriate. Step 418 may further include the aggregation of the annotations from individual paragraphs into section level annotations, depending on the annotation model.

The rendered text may be saved to disk, or, optionally, an XML file of just the annotations may be generated to allow use of a renderer to run in standalone mode without having to access the network to perform classification or text analytics. If executing in such a stand-alone mode, a custom application 410 may take the original file 412, the XML file (i.e., the annotations), and render the file based on the annotations and information contained in the XML file.

An example of the rendered file may include
Paragraph 1 blah blah blah
blah blah blah blah blah blah [ NOTATION HERE]
Paragraph 2 blah blah blah
blah blah blah blah blah blah [ NOTATION HERE]
Paragraph 3 blah blah blah
blah blah blah blah blah blah [ NOTATION HERE]

As can be seen in the above example, the text for each paragraph is followed by annotations/notations in the margins that are visually distinguishable from the actual text of the document. In this regard, the annotations may be displayed in a visually distinguishable manner (e.g., different font, font size, color, etc). The user may also have the option to display or not display such annotations.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention. In summary, embodiments of the invention provide the ability to use text analytics to produce margin notations for each paragraph of a document, for the purpose of aiding a human in more rapidly scanning/reading/understanding the document.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for annotating a document comprising:
   determining a type of the document using a classifier, wherein the type of document is a format within which the document is written;
   determining a subject domain of the document using the classifier, wherein the subject domain is a field, topic or genre of content set forth in the document;
   segmenting the document into one or more paragraphs and sections based on the document's structure using the classifier;
   determining and driving an annotation strategy based on the type of document using information from an annotation model, wherein the annotation strategy specifies one or more annotations to utilize and a location in the document's original text and on a margin of the document for the one or more annotations;
   loading a domain model based on the subject domain into a text analytics system, wherein the subject domain determines which domain model to load into the text analytics system and the domain model identifies terms, phrases, entities, and concepts of the subject domain to be annotated in the document;
   providing the one or more annotations in the document's original text and on the margin of the document for the paragraphs of the document based on the domain model and the annotation model using the text analytics system, wherein the one or more annotations comprise domain-specific keywords and concepts;
   aggregating the one or more annotations in the margin of the document for the paragraphs of the document into one or more section-level aggregated annotations for the sections of the document based on the annotation model using the text analytics system;
   annotating the document with the one or more annotations in the document's original text and on the margin of the document for the paragraphs, and with the one or more section-level aggregated annotations for the sections of the document, using a custom viewer/renderer application; and
   rendering the document including the one or more annotations and the one or more section-level aggregated annotations using the custom viewer/renderer application.

2. The method of claim 1, wherein the annotations for the paragraphs of the document are selected from the group consisting of: parts of speech, phrases, proper names, dates, and relationships.

3. The method of claim 1, further comprising normalizing the one or more annotations for the paragraphs of the document by:
   identifying sets of one or more synonyms; and
   determining normal forms using a lexical ontology.

4. The method of claim 1, further comprising:
   removing stop words; and
   removing words frequently occurring throughout the document, the subject domain, or a set of documents of which the document is a member.

5. The method of claim 1, wherein the annotating comprises annotating the document's original text by highlighting.

6. The method of claim 1, further comprising saving the rendering to disk.

7. The method of claim 1, further comprising generating an extensible markup language (XML) file of the one or more annotations, wherein a renderer is configured to execute in standalone mode based on the XML, file without having to access a network to perform classification or text analytics.

8. The method of claim 1, wherein the one or more annotations to utilize is selected from the group consisting of: word, phrase, concept cloud, list, quality indicator, and timeline.

* * * * *